United States Patent Office 3,355,465
Patented Nov. 28, 1967

3,355,465
PREPARATION OF KETONIC OXIDATION PRODUCTS FROM OLEFINICALLY UNSATURATED COMPOUNDS
Michael Sidney Jeremy Dallas and Jack Hilton, Birkenhead, England, assignors to Lever Brothers Company, New York, N.Y., a corporation of Maine
No Drawing. Filed Jan. 18, 1963, Ser. No. 252,314
Claims priority, application Great Britain, Jan. 24, 1962, 2,557/62
18 Claims. (Cl. 260—406)

This invention relates to olefinic compounds and especially to a novel method of preparing reaction products from such compounds.

It is known that many kinds of olefinic compound react with mercuric salts in the presence of a solvent containing replaceable hydrogen to produce ionisable adducts which are stable at ordinary or even moderately elevated temperatures in the absence of acid, but which are readily decomposed even in the cold by hydrochloric acid and certain other acids to regenerate the original olefinic compound. By a solvent containing replaceable hydrogen is meant one containing at least one hydrogen atom capable of replacement by a sodium atom. Such solvents will hereinafter be termed "reactive solvents."

Among olefinic compounds that form such adducts mention may be made of: hydrocarbons such as the alkenes, aralkenes and cycloalkenes, for instance propylene and its higher homologues, butadiene, isoprene, styrene, cyclohexene and cyclopentadiene, olefinic alcohols, for instance allyl alcohol and higher unsaturated alcohols, olefinic aldehydes and ketones, and olefinic mono- and poly-carboxylic acids, including those containing other functional groups in addition to the carboxyl group or groups, for instance palmitoleic, oleic, linoleic, linolenic, ricinoleic, licanic, fumaric, and cinnamic acids, their salts, their esters, especially methyl and higher alkyl esters.

Reactive solvents, as defined above, that have been referred to as capable of employment in the formation of adducts of the kind described above include: water, the lower monohydric alcohols, especially methanol, alcohols of relatively low molecular weight containing more than one hydroxy group, for instance ethylene glycol, and the lower saturated monocarboxylic acids, especially acetic.

The nature of the adduct formed depends on the nature of the solvent used and the following general formulae have been suggested for the adducts formed using solvents of the various classes referred to above with mercuric acetate as the metal salt:

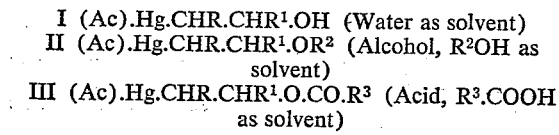

where Ac represents the group $CH_3.CO.O-$ and R, $R^1$, $R^2$ and $R^3$ are hydrocarbon radicals.

It has now been found that useful oxidation products of unsaturated compounds of the kind referred to above (for instance, products in which a $-CH:CH-$ group has been converted to a $-CO.CH_2-$ group) can be obtained by bringing the unsaturated compound into contact with cation exchange material in the presence of ionisable mercuric mercury and of a reactive solvent, allowing reaction to occur and continually removing the desired oxidation products in the presence of a solvent (either reactive or non-reactive) for the oxidation products.

In particular, the invention provides a process for the production of ketonic oxidation products of olefinically unsaturated compounds, wherein the olefinic compound is oxidised by mercuric mercury in the presence of an alcoholic compound containing 1 to 4 carbon atoms, the reaction being effected in the presence of a cation exchange material and the oxidation product formed being extracted by means of an organic solvent therefor. Typical solvents which may be used for this purpose are alcohols containing from 1 to 3 carbon atoms.

In one advantageous method of carrying out the invention the mercury is present in the form of a mercuric salt of the cation exchange material, such as can be formed by reacting that material in its acidic form with a water soluble salt of the metal. The salt, for instance mercuric acetate in aqueous solution, may, for instance be passed through a bed of the cation exchange material, in excess of the capacity thereof. After removing any unreacted salt by washing with water the cation exchange material may then be washed with the alcoholic compound and the olefinic compound (conveniently in solution in the alcohol) may then be passed through the bed, after which a slow flow of solvent (either reactive or non-reactive) is maintained through the bed to further the desired reaction and remove the required oxidation products, which are then recovered from solution in the solvent flowing away from the bed. During the reaction the bed is maintained at a suitable temperature which varies somewhat according to the nature of the unsaturated compound being treated but will generally be found between 0 and 100° C. and especially between 20 and 40 or 50° C.

In carrying out the reaction no added oxidising agent is necessary, nor need the reaction be carried out in the presence of atmospheric oxygen. The oxidation is effected with reduction of the mercuric mercury. A catalyst, for instance an acid, base or peroxy compound, may be present.

The cation exchange material is preferably a conventional resin of the sulphonated vinyl aryl type, for example a styrene polymer cross-linked with divinyl benzene and sulphonated. The pore size must be sufficiently large to accommodate the molecule of the olefinic compound treated, hence with long chain olefinic compounds the degree of cross-linking should be relatively low. Useful results have been obtained with resins in which the proportion of divinyl benzene amounted to 1 to 12% of the weight of styrene but with a view to obtaining relatively high reaction rates and efficient use of the mercury it is preferred to employ a proportion of about 1 to 4% especially about 2% of divinyl benzene. This is indicative of the pore size that is most useful in carrying out the process of the invention. The material may conveniently be used in the form of grains or beads which pass a sieve of 50 meshes per inch and are retained by one of 100 meshes per inch but the grain size is not critical.

Excellent results have been obtained using mercuric acetate as the metallic salt but other water soluble ionisable mercuric salts, especially salts of lower aliphatic mono-carboxylic acids, for example mercuric propionate, may be used. Mercuric salts of inorganic acids that may be used include the nitrate and sulphate. The salt is preferably used in dilute aqueous solution, for example 0.05 to 0.5 and especially 0.1 to 0.2, molar solution, in an amount ranging from about 0.5 to about 3 (for instance 1 to 1.5 or 2) moles of mercuric salt per mole-capacity of the resin expressed in moles of acid per litre of resin volume. The solution may be neutral or weakly acid, for instance it may contain 0.2 to 1% of free acetic acid. Acid stabilises the solution but as the acidity inureases the amount of mercury going into the resin phase drops. The time of contact of the salt with the resin is not critical and times ranging from 5 minutes to several hours have given useful results at room temperature. The take-up of mercury continues after several hours though most of it occurs in the first 30 minutes.

After passing the aqueous solution of the salt through the resin bed any residual free salt may be washed out with water or dilute aqueous acetic acid. About one fifth of the volume of the salt solution used of 0.5% acetic acid may be used for this purpose. This washing is not essential but it minimises the mercury salt later washed out with the desired oxidation products.

The resin volumes specified herein are the volumes in cc. of the cation exchange resin in its initial moist form before mercuriation.

The alcoholic compound used is preferably methanol but other saturated alcohols containing 1 to 3 carbon atoms, for instance ethanol and isopropanol can be used. Under completely anhydrous conditions, as when the mercuriated resin, the alcohol and the olefinic compound are carefully dried, the yield of the desired ketonic oxidation products is negligible. Hence at least a small proportion of moisture should be present. The use of the alcohols in their ordinary commercial forms will ensure the presence of sufficient moisture. Good results have been obtained with 95% methanol, 98% ethanol (both by volume) and even with analytical reagent grades of these alcohols and of isopropanol, containing less than 0.1% of water. The presence of some 2 to 5% by volume of water in the alcohol appears advantageous.

Before bringing the olefinic compound into contact with the mercury salt of the resin, most of the water is preferably displaced therefrom by washing with the alcohol, for instance in proportions equivalent to about 1 to 2 or 3 times the volume of the bed. The olefinic compound, for instance methyl oleate, dissolved in the alcohol, for instance in an equal volume of the solvent when it is sufficiently soluble therein, may then be run on to the column. An important factor affecting the reaction is the molar ratio of mercury initially present in the resin phase at the start of the addition of olefine, to olefine. Although conversions ranging from 8 to 24% have been obtained when this ratio was as low as 2:1, at 4:1 conversions of 30 to 50% can be obtained while conversions of 40 to 70% are obtainable at ratios of 8:1 or higher. It is generally preferable for the ratio to be between 4:1 and 16:1.

After the addition of the olefinic compound further proportions of the alcohol, or of other solvent (reactive or non-reactive) for the reaction products required, are passed through the bed at a slow rate, for example 0.01 to 0.02 volumes per bed-volume per minute, for a period depending on the conversion required, the bed being maintained at a suitable temperature meanwhile, and the desired oxidation products are recovered from the solvent, for instance by evaporation thereof when the desired products are of sufficiently low volatility.

The temperature should be sufficiently high to give a reasonable rate of reaction but not so high as to cause excessive evaporation of the alcohol or other solvent. Temperatures of 25 to 50° C. are generally most suitable.

The reaction time, and in consequence the rate of elution with solvent, may vary widely, for instance the time vary between 2 hours or even less and 24 hours or more. In general, periods of 2 to 3 or 4 hours are suitable.

The amount of solvent passed through the column to retract the resin may also vary widely, for instance from 2 to 12 bed-volumes. In general, 3 to 6 bed-volumes of solvent have been found sufficient.

The method described above may be modified in various ways. Thus, for instance, the mercuric salt of the cation exchange material may be formed by mildly agitating that material with an aqueous solution of the water soluble mercuric salt in a reaction vessel, filtering off the resulting mercuric salt of the exchange material, forming it into a bed and continuing the process as already described. Or the reaction between the mercuric salt of the exchange material, the alcohol and the olefinic substance may also be effected in a gently stirred reaction vessel followed by filtering off the adduct formed, treating this with a further quantity of the alcohol, filtering and recovering the desired oxidation product from the filtrate, for instance by evaporating the alcohol. Or the water soluble mercuric salt, the cation exchange material, the olefine and the alcohol may be brought together simultaneously to initiate the reaction, the adduct formed being then filtered off and eluted with further quantities of alcohol. A further alternative is the formation of an adduct of water soluble mercuric salt, olefinic compound and alcohol followed by feeding the reaction mixture on to a column of cation exchange material in acidic form and slow elution with further proportions of alcohol.

The following examples illustrate the invention:

*Example 1*

The cation exchange material consisted of a cross-linked sulphonated polymer of styrene cross-linked with 2% of divinyl benzene in the form of beads of mesh 50 to 100 per inch. The resin was charged into a tower to form a bed of height about 5 times its diameter.

The resin was now converted to the mercuric form by passing through the bed an aqueous solution containing 3.2 grm. of mercuric acetate and 0.5 grm. of free acetic acid per 100 cc. and was then washed with 0.5% acetic acid. Finally, immediately before use, the bed was washed with 2 to 3 times its volume of methanol to remove water.

There was then passed through the bed 10 to 15% of its volume of a 50% (by volume) solution of methyl oleate in methanol, the bed being held at a temperature of 25° C. While maintaining the bed at this temperature, methanol was passed through at the rate of 1 volume per volume of resin bed per hour for 24 hours.

From the washings there was recovered by distilling off the solvent a solid crystalline product containing 85% of its weight of a mixture of the methyl esters of 9- and 10-keto-octadecanoic acid, the conversion, based on the weight of methyl oleate, being 65 to 70%. The esters and the corresponding acids are difficult to prepare by other methods.

*Example 2*

The process was carried out as in Example 1 except that for washing out the oxidation product ethyl ether was used in place of methanol.

*Example 3*

The bed of cation exchange material was prepared as described in Example 1 except that the sulphonated styrene polymer was cross-linked with 4% of divinyl benzene. (Resin volume 45 cc.)

The resin was converted to the mercuric form by passing through the bed in turn (a) 4 volumes of 0.5 molar mercuric acetate in 1% of acetic acid, (b) 4 volumes of 1% acetic acid and (c) 2 volumes of methanol. 0.50 g. of methyl oleate in 2 cc. of methanol were brought on to the bed and eluted with methanol at 25° C. and at a rate of 0.7 volumes per hour for 3 hours.

The eluate, on evaporation of the solvent yielded a partly crystalline material containing about 60% of its weight of the methyl esters obtained in Example 1, in proportions showing a conversion of approximately 20%.

*Example 4*

The bed of cation exchange material was prepared as described in Example 1. (Resin volume 20 cc.)

The bed was washed in turn with (a) 20 volumes of 0.05 molar mercuric nitrate solution, (b) 5 volumes of 0.3% acetic acid and (c) 2 volumes of methanol, after which 0.20 g. of methyl oleate in 1 cc. of methanol were brought on to the bed and eluted with methanol at 25° C. and at a rate of 1.5 volumes per hour for 3 hours.

The eluate, on evaporation of the solvent yielded white, petrol-soluble crystals containing about 80% of the methyl esters obtained in Example 1, in proportions showing a conversion of 38%.

Example 5

The bed of cation exchange material was prepared as in Example 1 except that the styrene polymer was cross-linked with 1% of its weight of divinyl benzene. (Resin volume 55 cc.)

The bed was washed in turn with (a) 1.6 volumes of 0.5 molar mercuric acetate in 0.2% of acetic, (b) 1 volume of 0.2% acetic acid and (c) 1 volume of methanol, after which 1.47 g. of methyl oleate in 2 cc. of methanol were brought on to the bed and eluted with methanol at 25° C. and a rate of 0.25 volumes per hour for 24 hours.

The eluate, on evaporation of the solvent yielded petrol-soluble crystals of melting point 40° C. containing about 91% of the methyl esters obtained in Example 1, showing a conversion of 21%.

Example 6

The bed of cation exchange material was prepared as in Example 1. (Resin volume 20 cc.)

The bed was washed in turn with (a) 20 volumes of 0.05 molar mercuric acetate in 0.5% acetic acid, (b) 2 volumes of 0.5% acetic acid and (c) 2 volumes of ethanol, after which 0.40 g. of methyl oleate in 1 cc. of ethanol was brought on to the bed and eluted with ethanol at 25° C. and at a rate of 6 volumes per hour for 2 hours.

The eluate, on evaporation of the alcohol yielded petrol-soluble crystals containing about 57% of the methyl esters obtained in Example 1, in a proportion showing a yield of 37%.

Example 7

The sulphonated cross-linked styrene polymer resin (20 cc.) of Example 5 was agitated in a reaction vessel at 25° C. for 1 hour with 1.9 volumes of 0.1 molar mercuric acetate in 0.5% acetic acid, then for 5 minutes with 2 volumes of water and then for 20 minutes with 1 volume of isopropanol, the liquid phase being filtered off after each treatment. At this stage, while most of the resin was in the mercuric form, a small part was still in the acidic form.

The resin was then stirred with 0.131 g. of methyl oleate in 0.8 volume of isopropanol and filtered after 5 minutes. (Only 18% of the original oleate could be recovered from the filtrate, showing that 82% had reacted to form an adduct.) The resin was then given 3 successive washes each with 1.6 volumes of isopropanol and each lasting 2 hours, filtration being effected after each wash.

The 4 filtrates obtained from the filtration after formation of the adduct were then combined and on evaporation of the solvent yielded petrol-soluble crystals containing about 82% of the methyl esters obtained in Example 1, in a proportion showing a conversion of 67%.

Example 8

A resin of the kind specified in Example 5 (20 cc.) but in the sodium form was agitated successively (a) for 30 minutes with 2 volumes of 0.07 molar mercuric propionate in 0.3% of propionic acid, (b) for 5 minutes with 2 volumes of water, (c) for 20 minutes with 1 volume of methanol, (d) for 5 minutes with 0.122 g. of methyl oleate in 0.8 volume of methanol, and then given 3 successive washes with 0.8 volume of methanol, each wash lasting 2 hours and filtration being effected after each of these operations. After (d) filtrate from the first wash contained 23% of the original oleate. The combined filtrates from the last 4 stages yielded a petrol-soluble liquid containing 38% of the methyl esters obtained in Example 1, in proportions showing a conversion of 14%.

Example 9

The process was carried out as in Example 7 except that methanol was used throughout instead of isopropanol and the olefinic compound consisted of 0.123 g. of methyl elaidate in 0.8 volume of methanol. The first filtrate after forming the adduct yielded only 5% of the original elaidate showing that 95% thereof had entered into the adduct.

The 4 combined filtrates, after evaporation of solvent, yielded a partly crystalline material containing about 40% of the methyl esters obtained in Example 1, showing a conversion of about 28%.

Example 10

The process was carried out as in Example 9 but with methyl linoleate instead of the elaidate. After evaporation of the solvent from the combined filtrates a mixture of long-chain carbonyl compounds was obtained which was not analysed completely.

Example 11

The bed of cation exchange material was prepared as described in Example 1 and was washed successively with (a) 20 volumes of 0.1 molar mercuric acetate in 1% of acetic acid, (b) 4 volumes of 1% acetic acid and (c) 2 volumes of methanol. (Resin volume 45 cc.)

There was then brought on to the bed 0.5 g. of octadecene-1 in 6 cc. of a mixture of equal volumes of ether and methanol. The bed was then eluted with methanol at 25° C. at a rate of 0.7 volume per hour for 3 hours.

The eluate, on evaporation of the solvent, yielded white crystals containing substantial proportions of the corresponding 2-ketone. The temperature was then raised to 60° C. and elution with methanol continued in the same way as before. The eluate obtained yielded a further 0.2 g. of partly crystalline material containing substantial proportions of the ketone referred to.

Similar results were obtained with the corresponding $C_8$, $C_{10}$, $C_{12}$, $C_{14}$ and $C_{16}$ olefines.

Example 12

The methoxy-mercuriacetate adduct of methyl oleate was prepared by stirring together 0.59 g. of methyl oleate, 20 cc. of substantially anhydrous methanol, 0.2 cc. of water, 0.1 cc. of acetic acid and 0.96 g. of mercuric acetate until complete solution was effected and allowing the reaction mixture to stand for 24 hours at room temperature.

12 cc. of the cation exchange reagent specified in Example 1 was then formed into a bed as described therein and washed with 2 volumes of methanol. Then the solution of the adduct was passed down the column followed by substantially anhydrous methanol until 8½ volumes of eluate had been collected in the course of 4 hours.

The eluate yielded on evaporation a petrol-soluble liquid containing 20% of the keto esters obtained in Example 1, showing a conversion of 5%.

Instead of the methyl esters of oleic, elaidic and linoleic acids, methyl esters of other olefinically unsaturated carboxylic acids, especially monocarboxylic acids having an unbranched chain of 8 to 22 carbon atoms, for instance caproleic, myristoleic, palmitoleic, linolenic and erucic acid may be oxidised at double bonds by the method of the invention, as may be other alkyl esters, for example ethyl, propyl and isopropyl esters of such acids. With unsaturated esters of alcohols containing more than one hydroxy group, for instance glycerides containing unsaturated long chain acids such as the oleo distearins, reaction has been found to be very slow, nor does it seem likely that oxidation at a reasonably rapid rate can be effected with esters of unsaturated acids containing aromatic groups. With trans-methyl cinnamate, for example, extensive formation of the adduct occurred rapidly but after further reaction for 2 hours with methanol the proportion of ketonic oxidation product was very low. Similar results were obtained with 1,4-dihydronaphthalene. On the other hand, in straight chain unsaturated hydrocarbons, for instance n-alkenes containing 8 to 22 carbon atoms, oxidation occurs more readily. The invention includes the oxidation by the method described of other unsaturated aliphatic hydrocarbons, especially straight chain hydrocarbons, including those containing more than one double bond, as well as of derivatives of the unsaturated hydrocarbons containing functional groups other than ester groups. Useful results, for instance, have been obtained from oleyl alcohol and other olefinically unsaturated alcohols, especially long chain alcohols, can also be oxidised by the process of the invention to yield corresponding keto alcohols. Straight chain olefinic compounds have been specially referred to but the process of the invention can be applied also to the corresponding branched chain compounds provided that the molecule is not too bulky and an olefinic group is accessible.

Although in the elution of the oxidation products it is preferred to use the alcohol used in making the adducts, a variety of other organic solvents can be used including ether, acetone, petroleum fractions, benzene and chlorinated aliphatic hydrocarbons such as chloroform.

The adducts of the cation exchange resin, olefinic compound mercuric salt and alcohol which are formed as intermediates in the production of the oxidation products are believed to be novel. We have found that in the case of the adducts from aliphatic mono-olefinic compounds that oxidation can be slowed down very considerably by maintaining a low temperature, for instance 0 to −5° C. or less, and also that substantial proportions of the initial olefine can be recovered from them by elution with suitable acidic media, for instance hydrogen chloride in solution in equal proportions of methanol and ether.

It will be appreciated that with certain of the olefinic compounds treated, for instance with the 1-alkenes, oxidation at a double bond may produce in addition to a true ketone the corresponding aldehyde and in fact such aldehydes have been detected in the oxidation products. The term "ketonic oxidation product" is used herein to include aldehydes as well as ketones. Also a proportion of the ketonic oxidation products formed may react with the alcohol employed to form ketals or acetals. This has been found to occur to an extent that increases as anhydrous conditions in the reaction are approached.

The invention provides a method of making ketonic oxidation products of olefinic compounds of relatively high molecular weight such as cannot readily be obtained by other methods. Such products may be used as intermediates, for instance, in the production of surface active agents and plasticisers. The lower molecular products may also find a use in perfumery. Also, advantage may be taken of the adduct formation according to the invention to separate a particular olefinic compound from a compound having a reduced or negligible tendency to form such oxidisable adducts.

We claim:

1. A process for the production of ketonic oxidation products from olefinically unsaturated compounds comprising (a) combining (i) an aliphatic, olefinically unsaturated compound reactable with a water soluble, ionizable mercuric salt in the presence of a solvent having at least one hydrogen replaceable by a sodium atom to produce an ionizable adduct, said compound being selected from the group consisting of substantially linear olefinically unsaturated aliphatic hydrocarbons having from 8 to 22 carbon atoms and alkyl esters of substantially linear olefinically unsaturated fatty acids wherein the acid has from 8 to 22 carbon atoms, (ii) an alcohol having from 1 to 4 carbon atoms, and (iii) a mercuric salt of a cation exchange resin which is a sulfonated cross-linked polymer of an aromatic vinyl hydrocarbon, said compounds (i), (ii) and (iii) being capable of reacting with each other to form a water-insoluble adduct, said compounds being combined with each other at a temperature between about 0° C. and 100° C. in the presence of water the amount thereof not exceeding approximately 5% by volume of said alcohol (ii), whereby an adduct is formed; and (b) allowing said adducts to rearrange with the formation of a ketonic oxidation product of said olefin and extracting said ketonic oxidation product from said resin with a solvent therefor selected from the group consisting of said alcohol (ii) an diethyl ether as said ketonic oxidation product is formed.

2. A process according to claim 1, wherein the mole ratio of said ion exchange resin to said olefinically unsaturated compound is from about 4:1 to about 16:1.

3. A process according to claim 1, wherein said cation exchange resin is employed in the form of a bed, said process being effected by passing through said bed a solution of said olefinically unsaturated compound (i) in said alcohol (ii) and thereafter passing a solvent for said ketonic oxidation product through said bed thereby to elute said ketonic oxidation product.

4. A process according to claim 1, wherein said alcohol (ii) is selected from the group consisting of methanol and ethanol.

5. A process according to claim 1, wherein the solvent for said ketonic oxidation product is an alcohol having from 1 to 3 carbon atoms.

6. A process according to claim 1, wherein said solvent for said ketonic oxidation product is methanol.

7. A process according to claim 1, wherein said solvent for said ketonic oxidation product is dethyl ether.

8. A process according to claim 1, wherein said olefinically unsaturated compound is selected from the group consisting of (1) esters of oleic, caproleic, myristoleic, palmitoleic, linolenic, linoleic, erucic and elaidic acids with an alcohol selected from the group consisting of methanol, ethanol, propyl and isopropyl and (2) n-alkenes having from 8 to 22 carbon atoms.

9. A process according to claim 1, wherein said alcohol (ii) contains between about 2% and 5% water.

10. A process according to claim 1, wherein said resin is the sulfonate and polystyrene cross-linked with between about 1% and 12% divinyl benzene.

11. A process for the production of ketonic oxidation products from olefinically unsaturated compounds comprising (a) combining (i) an aliphatic, olefinically unsaturated compound reactable with a water soluble, ionizable mercuric salt in the presence of a solvent having at least one hydrogen replaceable by a sodium atom to produce an ionizable adduct, said compound being selected from the group consisting of substantially linear olefinically unsaturated aliphatic hydrocarbons having from 8 to 22 carbon atoms and alkyl esters of substantially linear olefinically unsaturated fatty acids where the acid has from 8 to 22 carbon atoms, (ii) an alcohol containing from 1 to 4 carbon atoms, (iii) the acid form of a cation exchange resin which is a sulfonated cross-linked polymer of an aromatic vinyl hydrocarbon, and (iv) a water-soluble ionizable mercuric salt, said compounds (i), (ii), (iii) and (iv) being capable of reacting with each other to form a water-insoluble adduct, said compounds being combined with each other at a temperature between about 0° C. and 100° C. in the presence of a water the amount thereof not exceeding about 5% by volume of said alcohol (ii), whereby an adduct is formed; and (b) allowing said adduct to rearrange with the formation of a ketonic oxidation product of said olefinically unsaturated compound and extracting said ketonic oxidation product from said resin with a solvent therefor which is selected from the group consisting of said alcohol (ii) and diethyl ether as said ketonic oxidation product is formed.

12. A process according to claim 11, wherein said ion exchange resin (iii) is combined with an aqueous solution of said mercuric salt (iv), thereby to convert said resin into its mercuric salt, and thereafter combining said mercuric salt of the ion exchange resin with said olefinically unsaturated compound (i) and said alcohol (ii).

13. A process according to claim 12, wherein said aqueous solution is a 0.05 to 0.5 molar solution of a salt selected from the group consisting of the mercuric salts of the lower carboxylic acids, mercuric nitrate and mercuric sulfate.

14. A process according to claim 12, wherein said aqueous solution contains from 0.2% to 1% acetic acid.

15. A process according to claim 12, wherein said mercuric salt is mercuric acetate.

16. A process according to claim 12, wherein said ion exchange resin is in the form of a bed and said solution of mercuric salt is passed through said bed.

17. A process according to claim 12, wherein said ion exchange resin is in the form of a bed, said resin is converted into its mercuric form by passing said solution of mercuric salt through said bed, and mercuric salts remaining uncombined in said bed are flushed out with a member of the class consisting of water and dilute acetic acid before introducing said olefinically unsaturated compound (i) and said alcohol (ii).

18. A process according to claim 17, wherein a substantial portion of said member remaining in said bed is flushed out with said alcohol (ii) before said olefinically unsaturated compound (i) is introduced.

References Cited
UNITED STATES PATENTS 2,853,520    9/1958    Newman _____ 260—2.2
3,201,357    8/1965    Fang _____ 260—2.2

ALEX MAZEL, *Primary Examiner.*

WILLIAM H. SHORT, CHARLES B. PARKER,
*Examiners.*

J. C. MARTIN, A. H. SUTTO, R. J. GALLAGHER,
*Assistant Examiners.*